(12) United States Patent
Saito et al.

(10) Patent No.: US 6,628,650 B1
(45) Date of Patent: Sep. 30, 2003

(54) VARIABLE RATE TDM SWITCHING SYSTEM

(75) Inventors: Tadao Saito, Yokohama (JP); Hitoshi Aida, Kawasaki (JP); Terumasa Aoki, Kamifukuoka (JP); Soichiro Hidaka, Tokyo (JP); Udomkiat Bunworasate, Tokyo (JP)

(73) Assignee: University of Tokyo, Tokyo (JP)

( * ) Notice: Subject to any disclaimer, the term of this patent is extended or adjusted under 35 U.S.C. 154(b) by 0 days.

(21) Appl. No.: 09/363,649

(22) Filed: Jul. 30, 1999

(30) Foreign Application Priority Data

Jul. 31, 1998 (JP) .......................................... 10-217379

(51) Int. Cl.[7] .............................................. H04L 12/50
(52) U.S. Cl. ...................... 370/369; 370/375; 370/380; 370/442
(58) Field of Search ................................ 370/370, 369, 370/337, 347, 372, 375, 376, 380, 386, 434, 442, 458, 535–537

(56) References Cited

U.S. PATENT DOCUMENTS

| 5,914,952 A | * | 6/1999 | Eom et al. | ................... | 370/369 |
| 6,108,333 A | * | 8/2000 | Raamot et al. | ............. | 370/370 |
| 6,438,126 B1 | * | 8/2002 | Roos | ......................... | 370/369 |

FOREIGN PATENT DOCUMENTS

| JP | A-1-177799 | 7/1989 |
| JP | A-6-29970 | 2/1994 |
| JP | A-6-233337 | 8/1994 |

* cited by examiner

*Primary Examiner*—Hassan Kizou
*Assistant Examiner*—John Pezzlo
(74) *Attorney, Agent, or Firm*—Venable LLP; Robert J. Frank; Jeffrey W. Gluck

(57) ABSTRACT

There is provided a variable rate TDM switching system comprising steps of: arranging a plurality of incoming lines and a plurality of sending lines in lattice form; providing time-division gates at cross-points of the incoming lines and the sending lines; connecting time-division temporal switches having a function of transposing the order of time slots in input TDM frames to forward stage of respective incoming lines of the time-division space switches for performing the switching between the incoming lines and the sending lines with time slot unit while holding the multiplexing, by switching these time-division gates; connecting a scheduler for concentratedly controlling the time-division gates and the time-division temporal switches to these gates and time switches; transmitting the headers of the TDM frames to the scheduler in case of inputting the header of TDM frame, and deciding the temporal switching schedule by the scheduler as to the transposition of the order of time slots in the time-division temporal switch, so as to disperse time slots of the same destination temporally; deciding the spatial switching schedule as to the on off of the time-division gates in the time-division temporal switches so as to appear only one time slot of the destination on the same sending line at the same timing; inputting the TDM frames into the time-division temporal switches with temporal switching by the time-division temporal switch in accordance with the temporal switching schedule; and switching respective time slots into the sending lines of respective destinations.

17 Claims, 8 Drawing Sheets

☒ : Address filter
▥ : Buffer

VARIABLE RATE TDM SWITCHING SYSTEM

FIELD OF THE INVENTION

The present invention relates to a digital switching system, and more particularly to a variable rate TDM switching system for switching variable rate data traffic such as video traffic.

RELATED ART STATEMENT

As known digital switching systems, a TDM (Time division Multiplexing) switch and an ATM (Asynchronous Transfer Mode) switch are broadly used.

The S-Switch (Space-switch) is the typical TDM switch. In the S-switch, data for a plurality of calls are time division multiplexed, and are transmitted in a TDM frame as a unit. The TDM frame is comprised of time slots having a length of about 1 octet, and the TDM frame period is about 125 $\mu$s. In the TDM frame, the numbers of the time slots assigned to each of the calls and those positions are not changed during the establishment of the connection. FIG. 1 is a schematic view showing a principle of the S switch. The S switch comprises time-division gates provided at cross-points of input lines and output lines arranged in a lattice form, and a control memory for controlling the time-division gates. The S switch switches the TDM frames for multiplexing between the input lines and the output lines by switching the time-division gates at high speed, with a time slot as a unit. Each of the time slots in the input TDM frame is moved to the time slot in the output TDM frame on the output line of destination through the time-division gate specified by the control memory. Then, the temporal position of the time slot is kept so that the temporal position on the input line is identical with the temporal position on the output line. The control memory is provided at every output line and store schedules in which the time-division gates are opened to pass the time slot.

The TDM switch has an advantage that once the connection is setup, a delay assurance and a loss rate assurance can be guaranteed without performing a special control such as a flow control, a vergence control, etc. The TDM switch is now mainly used for a speech communication imposed with a strict delay assurance.

However, the TDM switch has the following problems. One problem is that a maximum rate of the TDM bus or a maximum rate of a RAM restricts increasing the capacity of the TDM switch. Furthermore, as the number of input lines increases, establishing synchronization of the input time slots becomes more difficult so that it is difficult to increase the capacity by more than about 10 Gbps.

Another problem is that it is difficult to handle multiple rate data traffic. Although the TDM switch provides means for switching efficiently same rate data traffic, the TDM switch cannot operate efficiently when there is traffic requiring various rates. Thus, it is difficult to handle multi-rate traffic because delay of the time slots is increased.

A further problem is that it is difficult to handle variable rate data traffic, since in the current TDM switching networks, in order to handle the variable rate traffic, the time slots must be required at the maximum rate of the traffic, and thus the transmission efficiency is reduced significantly. For example, in addition to the speech traffic, video traffic is also imposed with strict delay assurance. An MPEG2 is a typical video coding system. Coding due to the MPEG2 produces usually variable rate traffic. FIG. 3 is a graph representing a distribution of frame sizes of the MPEG2 stream. Assuming that an average available band of the variable rate traffic is about 1 Mbps and a maximum rate of the same band is about 5 Mbps, in the known TDM switching system, the connection must be set to about 5 Mbps as the maximum available band. However, because the average available band is about 1 Mbps, the traffic band of about 4 Mbps is wasted.

A cross-point buffer switch is the typical ATM switching system. FIG. 2 is a schematic view showing a principle of the cross-point buffer switch. The cross-point buffer switch comprises buffers each provided at cross-points between input lines and output lines arranged in a lattice form. Address filters are each followed by the buffers. Output control circuits are each connected to the output lines. In the cross-point buffer switch, data for a plurality of calls are time division multiplexed, and are transmitted in an ATM cell as a unit. The ATM cell has a length of 53 bytes, and comprises a header having a length of 5 bytes and a payload having a length of 48 bytes. Now, using the buffer $B_{ij}$ connected to the input port $I_i$ and the output port $O_j$, the operation of the cross-point buffer switch is described. The address filter $F_{ij}$ checks the header of the ATM cell inputted from the input line $I_i$ and stores only the ATM cells destined for the output line $O_j$ into the buffer $B_{ij}$. When the cells to be sent are being stored in the buffer $B_{ij}$, the buffer $B_{ij}$ requests permission to send the cells to the output control circuit $C_j$. The output control circuit $C_j$ requires the buffer $B_{ij}$ to send the ATM cells in consideration of all requests of buffers related to output line $O_j$.

In the known ATM switch, because of the subdivision of the stream into the small ATM cells, an overhead caused by a cell assemble/disassemble and addition of the header becomes very large, and the switching speed becomes unnecessarily high. The known ATM switch also has a drawback that because the header is added to every ATM cell, high speed header processing is required. Moreover, for example, in the case of video traffic, when one ATM cell is lost, the quality of the picture can be significantly degraded. Furthermore, because the ATM switch cannot distinguish the types of data contained in the ATM cells, active processing is very difficult at the switch level. Therefore, controls in upper layers can be complicated.

SUMMARY OF THE INVENTION

It is an object of the present invention to avoid the problems of the above conventional switching system.

It is an object of the present invention to provide a variable rate TDM switching system suitable for handling efficiently the traffic imposed with strict delay assurance, particularly video traffic.

According to the invention, there is provided a method of operating a variable rate TDM switching system comprising the steps of:

arranging a plurality of incoming lines and a plurality of sending lines in lattice form;

providing time-division gates at cross-points of the incoming lines and the sending lines;

connecting time-division temporal switches having a function of transposing the order of time slots in input TDM frames to forward stage of respective incoming lines of the time-division space switches for performing the switching between the incoming lines and the sending lines with time slot unit while holding the multiplexing, by switching these time-division gates;

connecting a scheduler for concentratedly controlling the time-division gates and the time-division temporal switches to these gates and time switches;

transmitting the headers of the TDM frames to the scheduler in case of inputting the header of TDM frame, and deciding the temporal switching schedule by the scheduler as to the transposition of the order of time slots in, the time-division temporal switch, so as to disperse time slots of the same destination temporally;

deciding the spatial switching schedule as to the on off of the time-division gates in the time-division temporal switches so as to appear only one time slot of the destination on the same sending line at the same timing;

inputting the TDM frames into the time-division temporal switches with temporal switching by the time-division temporal switch in accordance with the temporal switching schedule; and switching respective time slots into the sending lines of respective destinations.

In the variable rate TDM switch according to the invention, because the frame header contains the information about the positions of the time slots in the TDM frame, in the variable rate traffic, the connection does not need to be set at the maximum rate. If a too large amount of data is inputted into the switch, a plurality of TDM time slots can be assigned to transmit. Therefore, the variable rate traffic can be switched efficiently.

The known ATM switch switches the relatively small ATM cells, whereas the variable rate TDM switch according to the invention switches the relatively large TDM frame. Hence, compared to the known ATM switch, the switching delay increases with a low load. However, in the known ATM switch, the buffering delay increases with a high load. Whereas, in the variable rate TDM switch according to the invention, because the time slots destined for the same output line are temporally dispersed by the variable rate time switches, and then inputted to the variable rate space switch, the buffers are not required for the variable rate space switch. Therefore the delay characteristic is improved drastically. Moreover, in the known ATM switch, because the header is added to every ATM cell, high speed header processing is required. In the variable rate TDM switch on the other hand, because all information about the time slots in the TDM frame is contained in the TDM frame header, the header processing is easier than the known ATM switch.

According to the invention, there is provided a method of operating a variable rate TDM switching system comprising the steps of:

arranging a plurality of incoming lines and a plurality of sending lines in lattice form;

providing time-division gates at cross-points of the incoming lines and the sending lines;

connecting time-division time switches having a function of transposing the order of time slots in input TDM frames to forward stage of respective incoming lines of the time-division space switches for performing the switching between the incoming lines and the sending lines with time slot unit while holding the multiplexing, by switching these time-division gates, connecting a scheduler for concentratedly controlling the time-division gates and the time-division temporal switches to these gates and time switches;

connecting contents analyzer for informing information from the TDM frame to the scheduler;

transmitting the headers of the TDM frames to the contents analyzer in case of inputting the header of TDM frame, informing information as to the respective time slots in the TDM frame to the scheduler from the contents of the header of the TDM frame by the contents analyzer;

deciding the temporal switching schedule as to the transposition of the order of time slots in the time-division temporal switch in accordance with the information, so as to disperse time slots of the same destination temporally;

deciding the spatial switching schedule as to the on off of the time-division gates in the time-division temporal switches so as to appear only one time slot of the destination on the same sending line at the same timing;

inputting the TDM frames into the time-division spatial switches with temporal switching by the time-division temporal switch in accordance with the temporal switching schedule; and switching respective time slots into the sending lines of respective destinations in accordance with the spatial switching schedule by the time-division spatial switch.

In this way, the switching schedule can be determined with considering the types of data contained in the time slots. For example, in the case of the MPEG2, the MPEG2 stream contains I picture, P picture and B picture. If the B picture is lost, the quality of the image is less degraded, whereas if the I picture is lost, the quality of the image is much degraded. Thus, the I picture should be given a higher priority than that given to the B picture. In the variable rate TDM switching system according to the invention, the contents analyzer can distinguish the types of the picture. By assigning the priority levels depending on the types of the picture to the time slots, the scheduler can determine in order the switching schedule of the priority levels.

In the variable rate TDM switching system according to the invention, the time slots stored in the variable rate time switches must be rearranged so that there is only one time slot destined for the same output line at the same time, because there is no buffer in the variable rate space switch. The various switching schedules may be used for this purpose. Therefore, in a preferable embodiment of the variable rate TDM switching system according to the invention, the time-division spatial switch decides the spatial switching schedule in such a manner that the time slots of different incoming lines are assigned in turn to the respective TDM frames of the sending lines.

In another preferable embodiment of the variable rate TDM switching system according to the invention, the time-division spatial switch decides the spatial switching schedule in such a manner that the number of time slots to be used are counted every a pair of the sending line and the incoming line, thereby selecting the time slots in order of large number.

In further preferable embodiment of the variable rate TDM switching system according to the invention, the time slot length of the TDM frame is 16 kbit and the frame period of the TDM frame is a divisor of a video frame period of an input video signal. In this way, in the video traffic, the video frame period can be corresponded to the TDM frame period.

DESCRIPTION OF THE PREFERRED EMBODIMENTS

Figure 1:
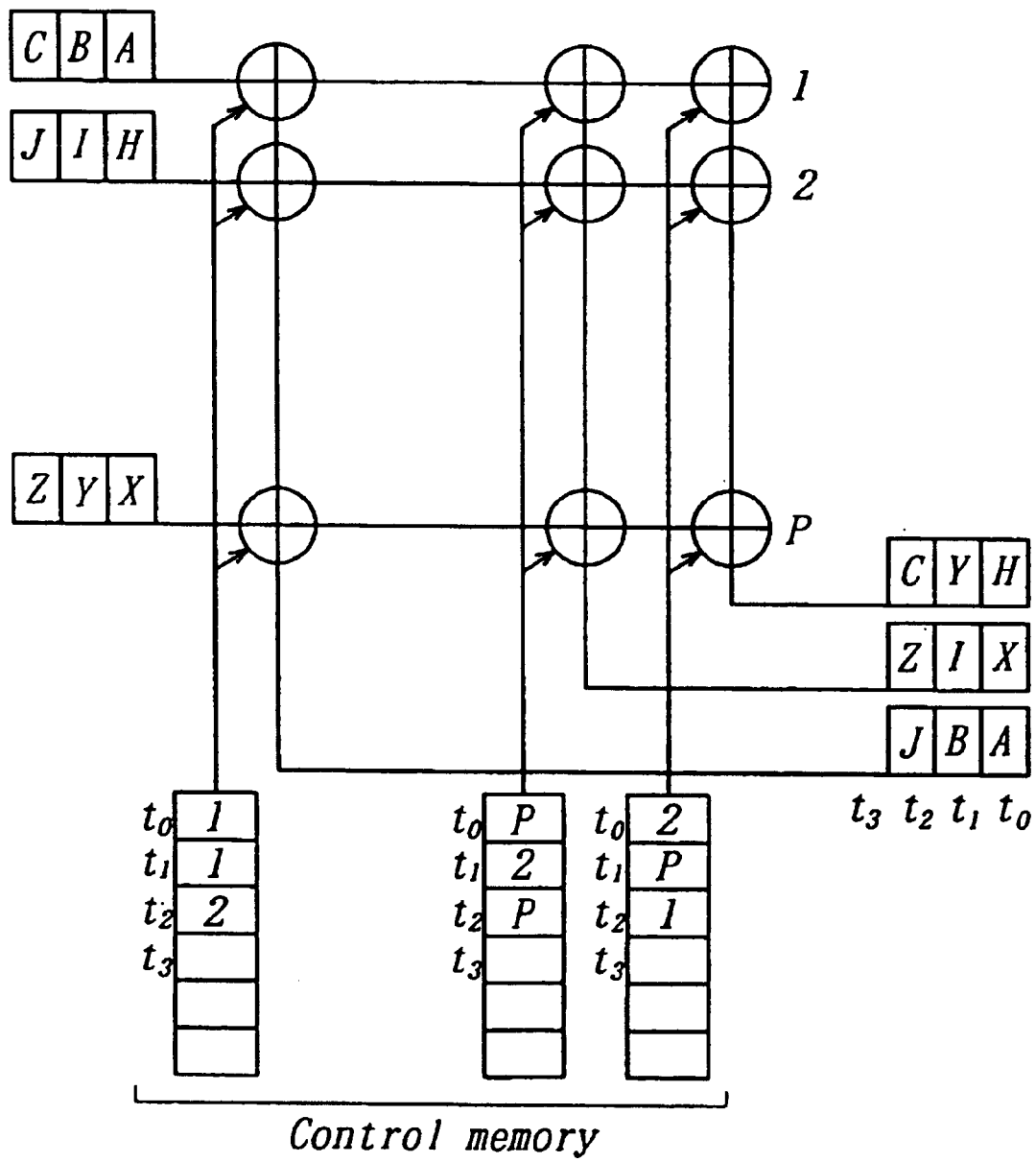
FIG. 1 is a schematic view showing an example of a known S switch.
Figure 2:
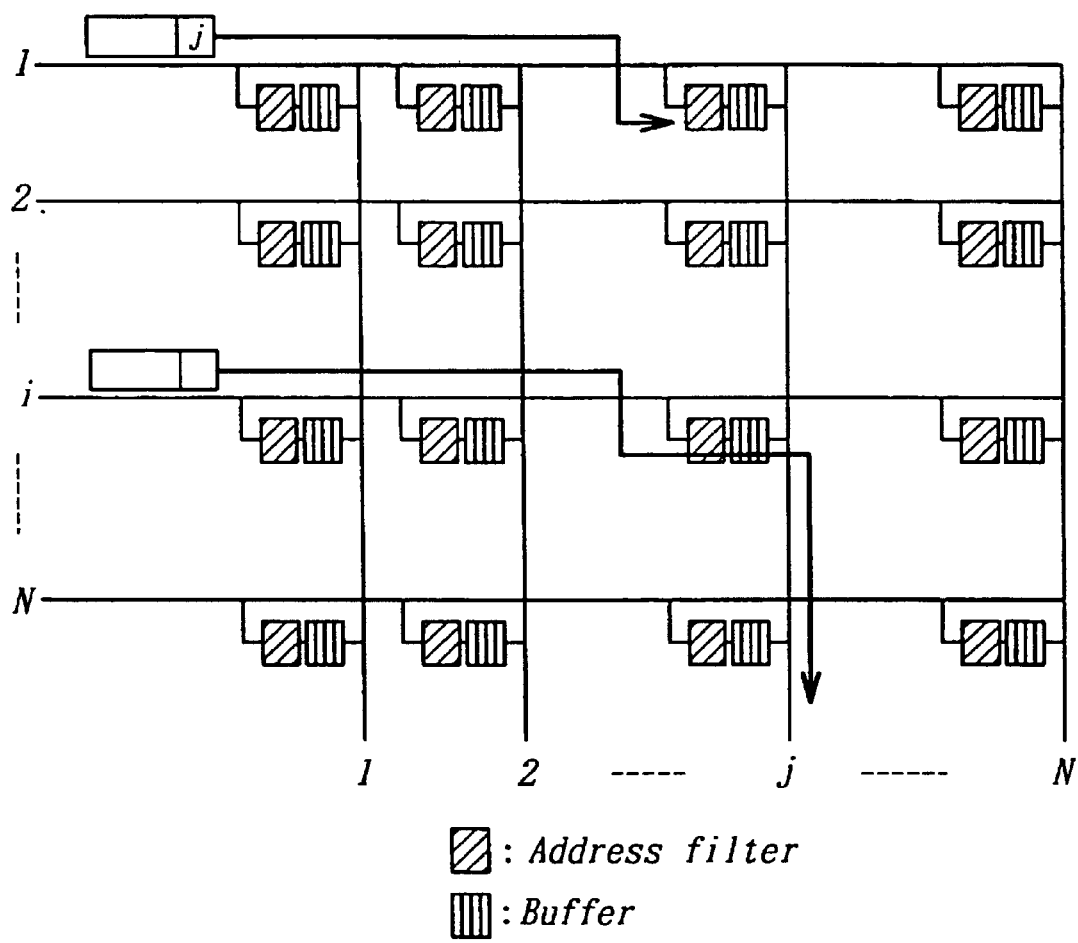
FIG. 2 is a schematic view showing an example of a known cross-point buffer switch.
Figure 3:
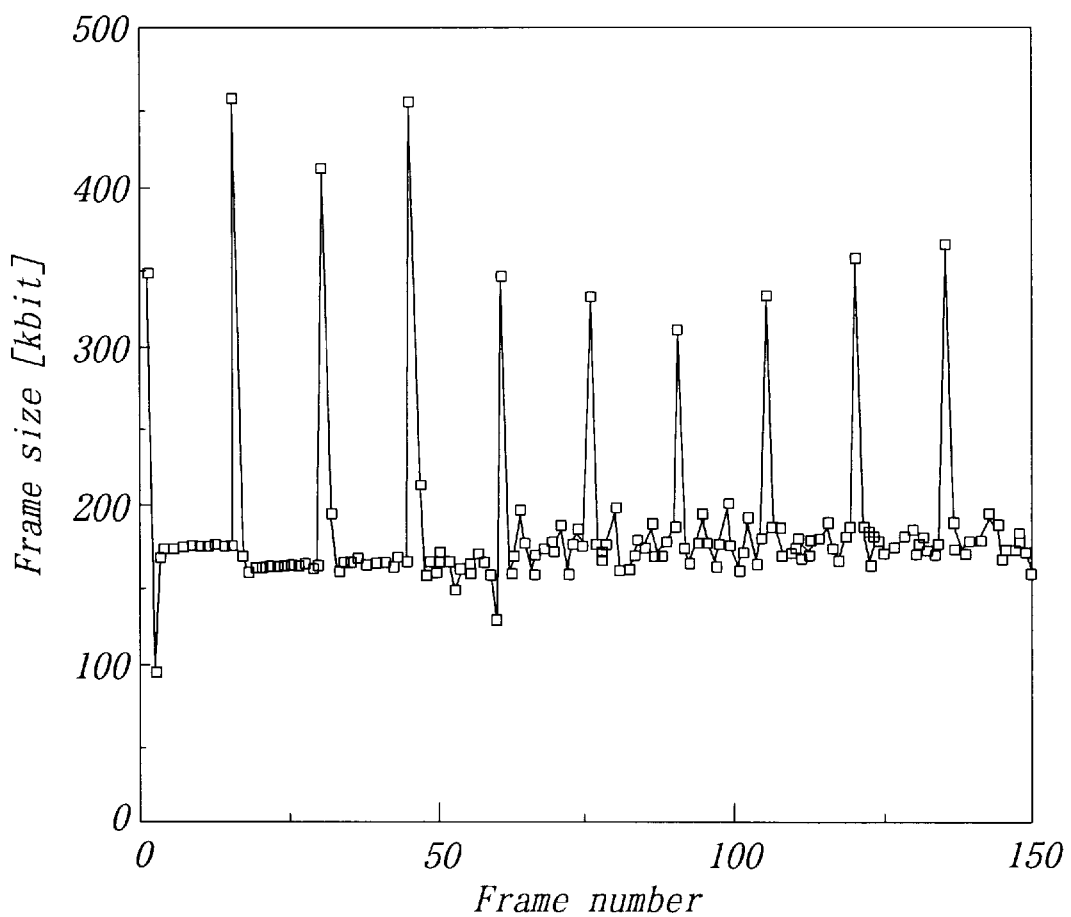
FIG. 3 is a graph representing a distribution of frame sizes of a MPEG2 stream.
Figure 4:
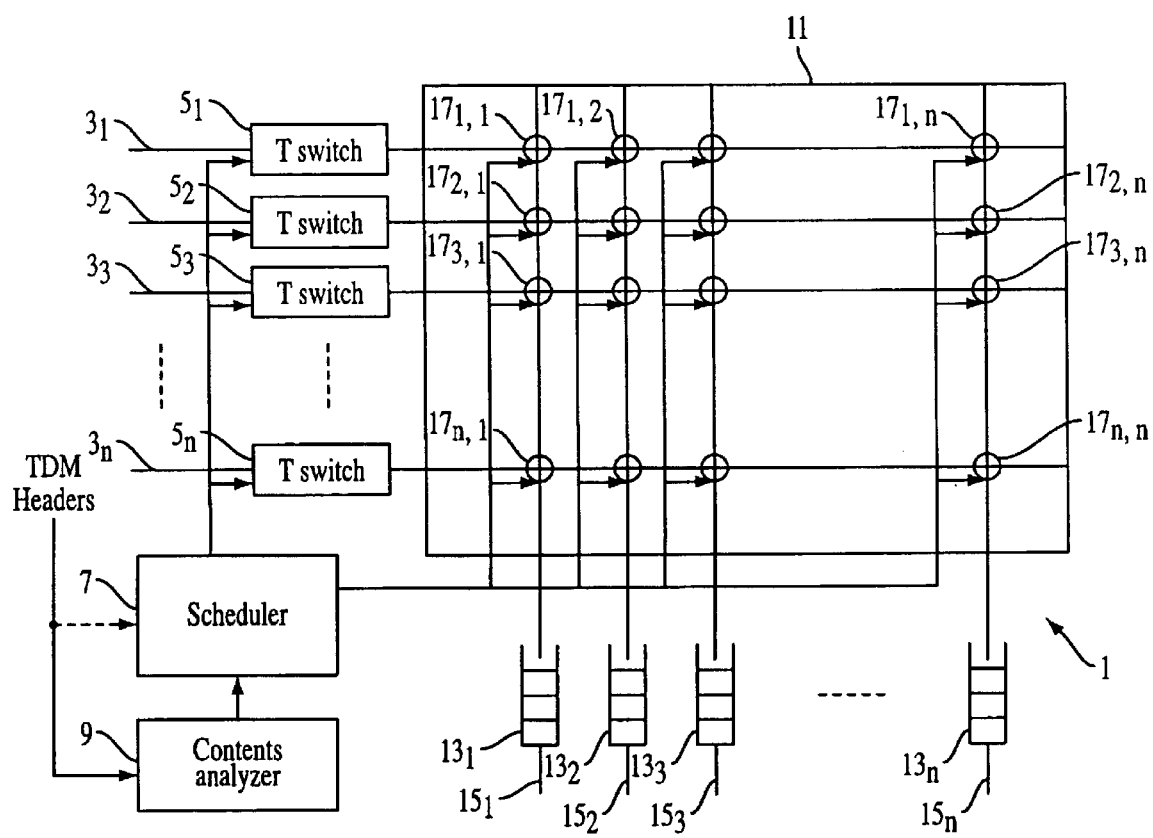
FIG. 4 is a schematic view showing an embodiment of the variable rate TDM switching system according to the present invention.

FIG. 4 is a schematic view showing an embodiment of the variable rate TDM switching system according to the present invention. A switch 1 comprises incoming line TDM buses $3_i$ (i=1, . . . ,n), variable rate time switches $5_i$, a scheduler 7, a contents analyzer 9, variable rate space switch 11, output buffers $13_j$ (j=1, . . . ,n) and sending line TDM buses $15_j$. The variable rate space switch 11 comprises time-division gates $17_{ij}$ at the cross-points between the incoming line TDM buses and the sending line TDM buses arranged in a latticed form.

Figure 5:
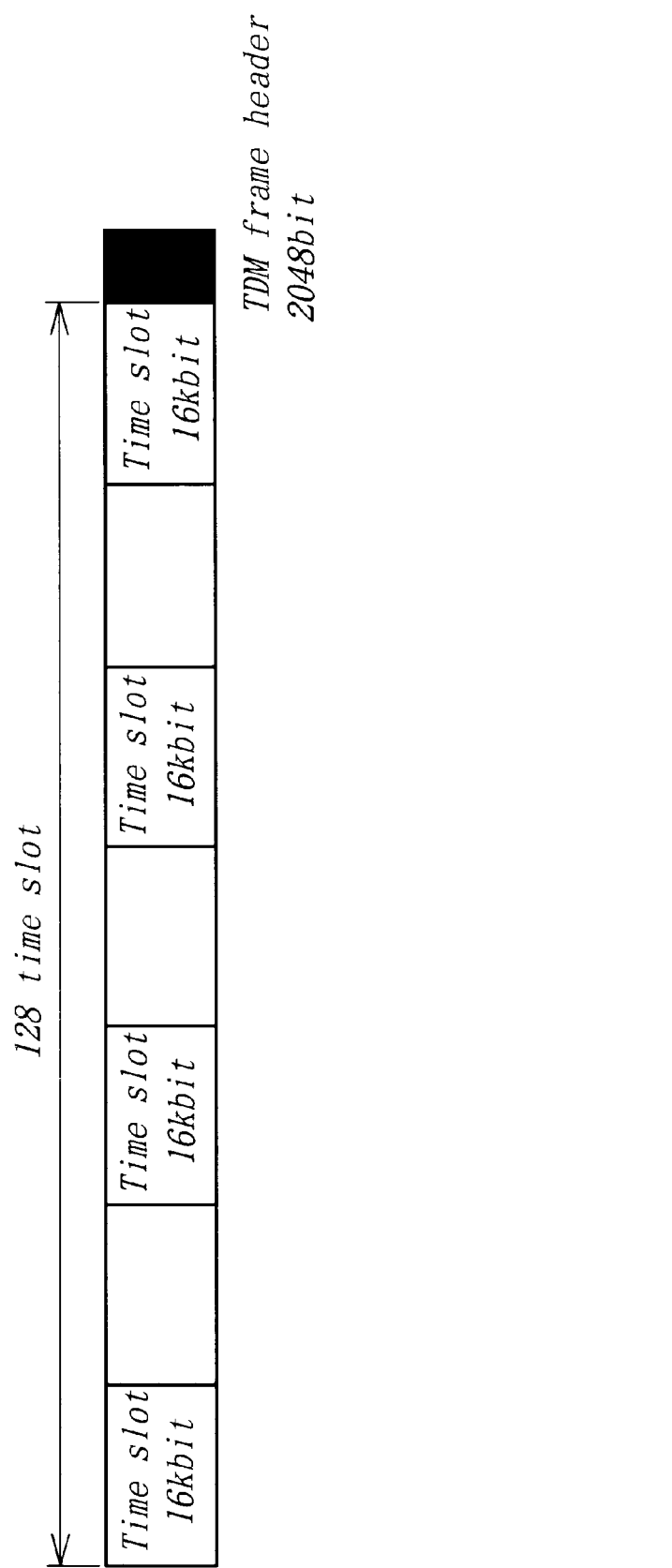
FIG. 5 is a diagram showing an example of a format of the TDM frame used to the variable TDM switching system shown in FIG. 4.
Figure 6:
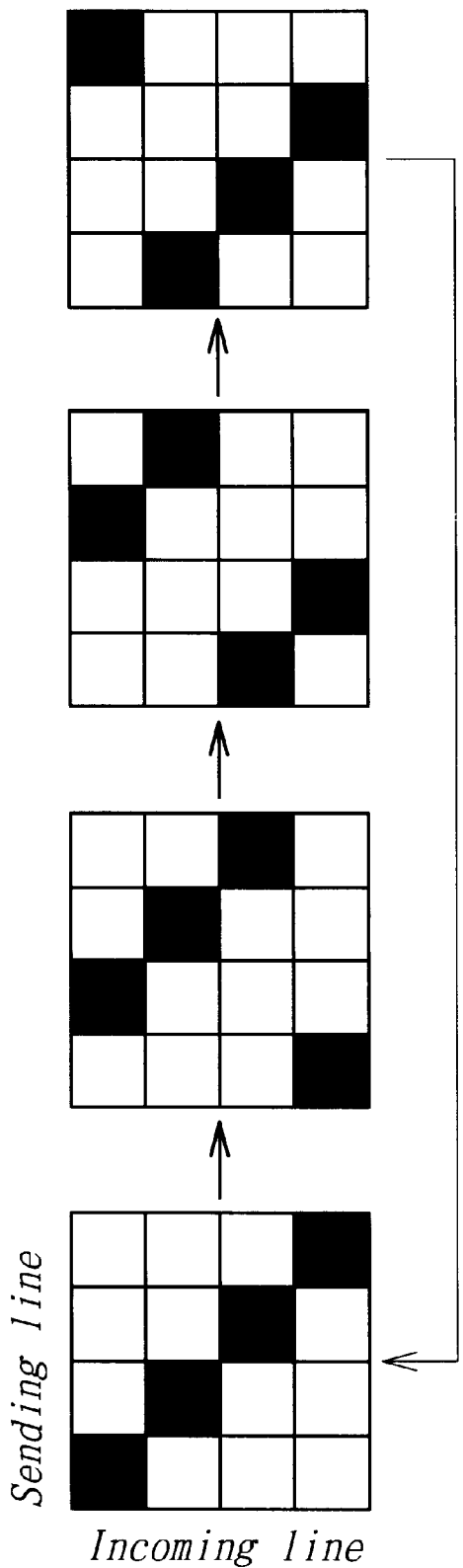
FIG. 6 is a diagram showing a concept of the RSA method.

FIG. 5 is a diagram showing an example of a format of the TDM frame used in the variable rate TDM switching system shown in FIG. 4. Usually the time slot length of the TDM frame is about 1 octet and the TDM frame period is about 125 μm. However, in the case of video traffic, a longer frame length improves the efficiency and facilitates increasing the capacity. Because the video frame period is 33 ms, for example, if the time slot length is 16 kbit and the TDM frame period is 3.3 ms (in the case of a 622.08 Mbps transmission rate), the TDM frame period is a divisor of the video frame period so that correspondence between the TDM frame period and the video frame period can be obtained. This correspondence makes possible a control for optimizing a quality of the video in the switch. Therefore, as compared with the conventional switching systems (TDM switching system, ATM switching system, packet switching system or the like), even if the qualities of the networks are identical, the quality of the video can be improved.

Now returning to FIG. 4, the operation of the variable rate TDM switching system according to the invention is described by way of example. If the TDM frame as shown in FIG. 5 is transmitted, the incoming line TDM buses and the sending line TDM buses are made high speed TDM buses having about 155 Mbps–50 Gbps of the transmission rate.

When TDM frames as shown in FIG. 5 are inputted periodically into each of the variable rate time switches 5 from the incoming line TDM buses 3, the time slots of the TDM frame are stored in a buffer of the variable rate time switch. At the same time, the frame header of the TDM frame is sent to the contents analyzer 9. The frame header of the TDM frame contains the information about the destination and the contents, that is, the type of each of the data contained in the time slots of the TDM frame. The contents analyzer, reads the frame header, distinguishes the destination and the type of data contained in each of the time slots of the TDM frame and sends them to the scheduler 7. The scheduler determines the schedule at which the time slots are sent to the variable rate space switch 11 depending on the destination and the priority level of each time slot, and sends the order to the variable rate time switch 5 and the variable rate space switch 11. The method for determining the order is described in the following. The variable rate time switches 5 read out the time slots from their buffers and supplies them to the variable rate space switch 11. The variable rate space switch switches the time division gates 17 according to the order determined by the scheduler 7, and outputs the time slots to the destinations.

Methods for the scheduling are described in the following.

A first method for the scheduling is a RSA (Rotation Selection Algorithm) method. FIGS. 6a–6d is a diagram showing a concept of the RSA method. In this example, the number of incoming lines and the number of the sending lines is 4. In this figure, each row is the incoming line number and each column is the sending line number. First, referring to FIG. 6a, the time slot to be transmitted from the incoming line 1 to the sending line 1, the time slot to be transmitted from the incoming line 2 to the sending line 2, . . . etc. are first selected and inputted into the output TDM frames. Next, referring to FIG. 6b, the time slot to be transmitted from the incoming line 1 to the sending line 2, the time slot to be transmitted from the incoming line 2 to the sending line 3, . . . etc. are selected and inputted into the output TDM frames. In the same way, referring to FIGS. 6a and 6b, all the time slots are selected and inputted in to the output TDM frames. Thus, it can be seen that only one time slot destined to the same sending line exists at the same time.

Figure 7:
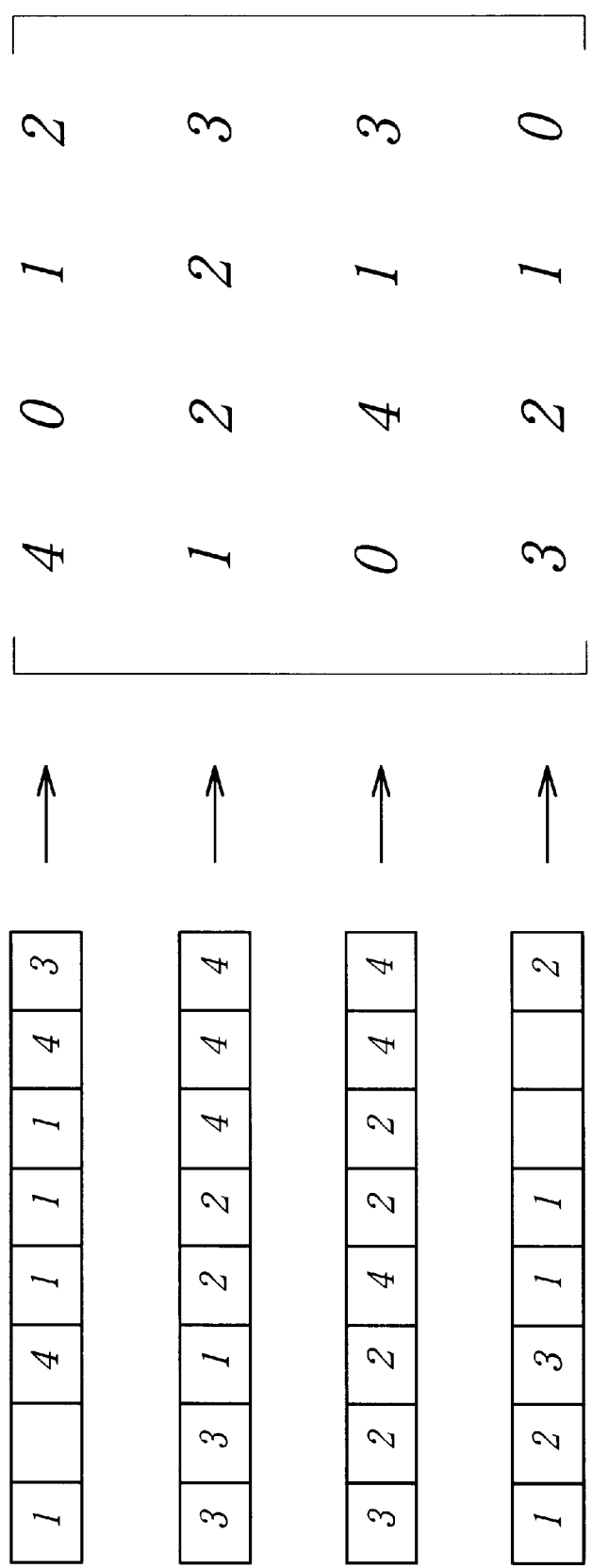
FIG. 7 is a diagram showing a concept of a traffic matrix.
Figure 8:
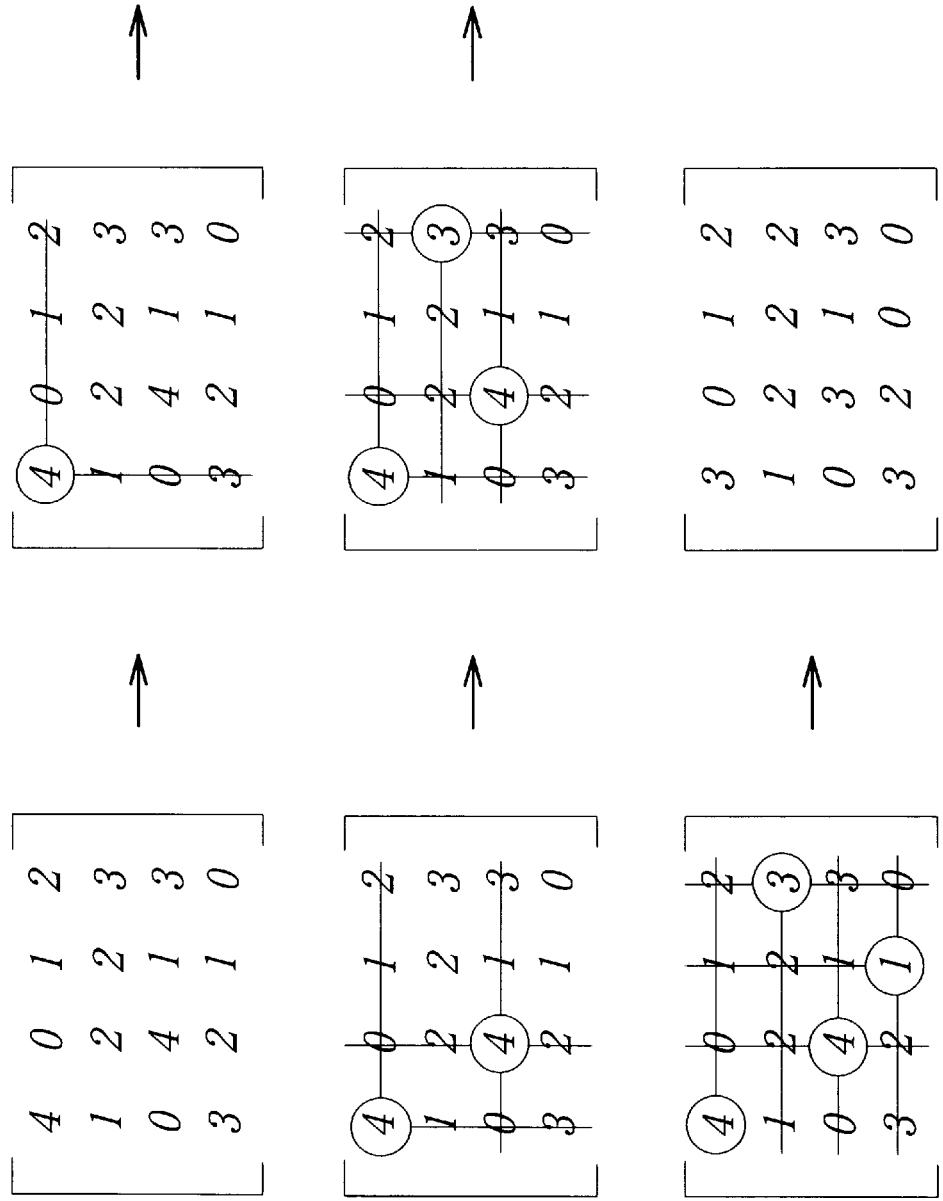
FIG. 8 is a diagram showing a concept of the GLQA method.

A second method for the scheduling is a GLQA (Global Longest Queue Algorithm) method. A concept of a traffic matrix is introduced. FIG. 7 shows a manner for producing the traffic matrix from the frame header information. In this example, each of the numbers of the incoming lines $I_i$ (i=1, . . . ,4) and the sending lines $O_j$ (i=1, . . . ,4) is 4, and the number of channels (multiplicity) is 8. On the left hand in this figure, the numeral in each of the time slots is the sending number of destination (i.e. j). On the right hand in this figure, if the number of the lines is n by n, the traffic matrix is an n by n square matrix. An element $e_{ij}$ of the traffic matrix is the number of the time slots to be transmitted from the incoming line $I_i$ to the sending line $O_j$. In this method, as illustrated in FIG. 8, a first maximum number is found in the traffic matrix. Next, another maximum number is found in the traffic matrix without the row and the column containing the first maximum number. In the same way, the four elements are selected in the traffic matrix. The time slot corresponding to the elements are inputted to the output TDM buses at first. One element is decreased for each of the four elements, and the same selecting operation is done. In the same way, all the time slots are selected and inputted to the output TDM frames. Thus, it can be seen that only one time slot destined to each sending line exists at the same time.

In the embodiments described above, although the contents analyzer checks the frame header and informs its contents to the scheduler, the contents analyzer can be omitted so that the scheduler carries out the scheduling according to the contents of the frame header directly.

What is claimed is:

1. A method of operating a variable rate TDM switching system, wherein the input to the TDM switching system comprises TDM frames, each frame having a header and a plurality of time slots, said method comprising the steps of:

providing a variable rate space switch having a plurality of incoming lines and a plurality of sending lines arranged in a lattice form, said variable rate space switch having time-division gates at cross-points of said incoming and sending lines;

connecting variable rate time switches to respective incoming lines of the variable rate space switch, said variable rate time switches reading out and storing therein time slots of the TDM frames input thereto;

connecting a scheduler to said variable rate time switches and to said time-division gates, said scheduler receiving the headers of the TDM frames and determining from the headers
(1) the order in which the time slots stored in said variable rate time switches are to be sent to said time-division gates; and
(2) the time of switching on and off of said time-division gates so that only one time slot appears at a given time on each sending line;

inputting the TDM frames to the variable rate time switches, said variable rate time switches transmitting the time slots of said TDM frames to said time-division gates on the schedule determined by said scheduler; and switching on and off said time-division gates so that only one time slot appears at a given time on each sending line on the schedule determined by said scheduler.

2. A method of operating a variable rate TDM switching system, wherein the input to the TDM switching system comprises TDM frames, each frame having a header and a plurality of time slots, said method comprising the steps of:

providing a variable rate space switch having a plurality of incoming lines and a plurality of sending lines arranged in a lattice form, said variable rate space switch having time-division gates at cross-points of said incoming and sending lines;

connecting variable rate time switches to respective incoming lines of the variable rate space switch, said variable rate time switches reading out and storing therein time slots of the TDM frames input thereto;

connecting a scheduler to said variable rate time switches and to said time-division gates;

connecting a contents analyzer to said scheduler, said contents analyzer receiving the headers of the TDM frames, determining from the headers the information contained in each time slot of the TDM frame, and providing to said scheduler
(1) the order in which the time slots stored in said variable rate time switches are to be sent to said time-division gates; and
(2) the time of switching on and off of said time-division gates so that only one time slot appears at a given time on each sending line;

inputting the TDM frames to the variable rate time switches, said variable rate time switches transmitting the time slots of said TDM frames to said time-division gates on the schedule determined by said scheduler; and switching on and off said time-division gates so that only one time slot appears at a given time on each sending line on the schedule determined by said scheduler.

3. The method of operating a variable rate TDM switching system as claimed in claim 1, wherein time slots input on different incoming lines are assigned sequentially by said scheduler to respective TDM frames of the sending times.

4. The method of operating a variable rate TDM switching system as claimed in claim 2, wherein time slots input on different incoming lines are assigned sequentially by said scheduler to respective TDM frames of the sending times.

5. The method of operating a variable rate TDM switching system as claimed in claim 1, wherein time slots received on different incoming lines and destined for different sending lines are counted for each pair of incoming and sending lines, and the order in which time slots are sent to the sending lines is established by determining a first incoming line-sending line pair corresponding to a largest number of counted time slots, eliminating the first incoming line-sending line pair from further consideration and determining, from the remaining incoming lines and sending lines, a second selected incoming line-sending line pair corresponding to a largest number of counted time slots corresponding to the remaining incoming lines and sending lines, and so on, until the selection is completed.

6. The method of operating a variable rate TDM switching system as claimed in claim 2, wherein time slots received on different incoming lines and destined for different sending lines are counted for each pair of incoming and sending lines, and the order in which time slots are sent to the sending lines is established by determining a first incoming line-sending line pair corresponding to a largest number of counted time slots, eliminating the first incoming line-sending line pair from further consideration and determining, from the remaining incoming lines and sending lines a second selected incoming line-sending line pair corresponding to a largest number of counted time slots corresponding to the remaining incoming lines and sending lines, and so on, until the selection is completed.

7. The method of operating a variable rate TDM switching system as claimed in claim 1 wherein the time slot length of the TDM frame is 16 kbit and the frame period of the TDM frame is a divisor of a video frame period of an input video signal contained in the TDM frames.

8. The method of operating a variable rate TDM switching system as claimed in claim 2 wherein the time slot length of the TDM frame is 16 kbit and the frame period of the TDM frame is a divisor of a video frame period of an input video signal contained in the TDM frames.

9. The method of operating a variable rate TDM switching system as claimed in claim 3 wherein the time slot length of the TDM frame is 16 kbit and the frame period of the TDM frame is a divisor of a video frame period of an input video signal contained in the TDM frames.

10. A variable rate TDM switching system wherein the input to the TDM switching system comprises TDM frames, each frame having a header and a plurality of time slots, comprising:

a variable rate space switch having a plurality of incoming lines and a plurality of sending lines arranged in a lattice form, said variable rate space switch having time-division gates at cross-points of said incoming and sending lines;

a plurality of variable rate time switches connected to respective incoming lines of the variable rate space switch, said variable rate time switches reading out and storing therein time slots of the TDM frames input thereto;

a scheduler connected to said variable rate time switches and to said time-division gates, said scheduler receiving the headers of the TDM frames and determining from the headers
(1) the order in which the time slots stored in said variable rate time switches are to be sent to said time-division gates; and
(2) the time of switching on and off of said time-division gates so that only one time slot appears at a given time on each sending line;

whereby the time slots of the TDM frames input to said variable rate time switches are transmitted to said time-division gates on the schedule determined by said scheduler; and said time-division gates are switched on and off so that only one time slot appears at a given time on each sending line on the schedule determined by said scheduler.

11. The variable rate TDM switching system claimed in claim 10, which further comprises a contents analyzer coupled to said scheduler, said contents analyzer receiving the headers of the TDM frames, determining from the headers the information contained in each time slot of the TDM frame, and providing said information to said scheduler.

12. The variable rate TDM switching system claimed in claim 10, wherein time slots input on different incoming lines are assigned sequentially by said scheduler to respective TDM frames of the sending times.

13. The variable rate TDM switching system as claimed in claim 10, wherein time slots received on different incoming lines and destined for different sending lines are counted for each pair of incoming and sending lines, and the order in which time slots are sent to the sending lines is established by determining a first incoming line-sending line pair corresponding to a largest number of counted time slots, eliminating the first incoming line-sending line pair from further consideration and determining, from the remaining incoming lines and sending lines, a second selected incoming line-sending line pair corresponding to a largest number of counted time slots corresponding to the remaining incoming lines and sending lines, and so on, until the selection is completed.

14. The variable rate TDM switching system as claimed in claim 11, wherein time slots input on different incoming lines are assigned sequentially by said scheduler to respective TDM frames of the sending lines.

15. The variable rate TDM switching system as claimed in claim 11, wherein time slots received on different incoming lines and destined for different sending lines are counted for each pair of incoming and sending lines, and the order in which time slots are sent to the sending lines is established by determining a first incoming line-sending line pair corresponding to a largest number of counted time slots, eliminating the first incoming line-sending line pair from further consideration and determining, from the remaining incoming lines and sending lines, a second selected incoming line-sending line pair corresponding to a largest number of counted time slots corresponding to the remaining incoming lines and sending lines, and so on, until the selection is completed.

16. The variable rate TDM switching system as claimed in claim 10, wherein the time slot length of the TDM frame is 16 kbit and the frame period of the TDM frame is a divisor of a video frame period of an input video,signal contained in the TDM frames.

17. The variable rate TDM switching system as claimed in claim 11, wherein the time slot length of the TDM frame is 16 kbit and the frame period of the TDM frame is a divisor of a video frame period of an input video signal contained in the TDM frames.

* * * * *